United States Patent [19]

Schill et al.

[11] Patent Number: 4,596,476

[45] Date of Patent: Jun. 24, 1986

[54] LUBRICATING SYSTEM FOR SHAFT BEARINGS

[75] Inventors: Jürgen Schill, Weisenheim; Günther Klein, Lambsheim; Wilfried Lenk, Beindersheim, all of Fed. Rep. of Germany

[73] Assignee: Klein, Schanzlin & Becker Aktiengesellschaft, Frankenthal, Fed. Rep. of Germany

[21] Appl. No.: 613,971

[22] Filed: May 24, 1984

[30] Foreign Application Priority Data

May 28, 1983 [DE] Fed. Rep. of Germany ....... 3319537

[51] Int. Cl.⁴ .......................... F16C 3/14; F16C 37/00
[52] U.S. Cl. .................................... 384/467; 384/471; 384/472
[58] Field of Search ............... 384/313, 316, 320, 476, 384/467, 465, 472, 473, 471; 417/368

[56] References Cited

U.S. PATENT DOCUMENTS

| 1,865,088 | 6/1932 | Daun et al. | 384/465 |
| 2,447,671 | 8/1948 | Schuck | 384/472 X |
| 2,789,021 | 4/1957 | Pederson | 384/316 X |
| 2,854,594 | 9/1958 | Philippovic | 417/368 |
| 2,950,943 | 8/1960 | Forrest | 384/465 |
| 2,961,847 | 11/1960 | Whitney et al. | 384/313 X |

*Primary Examiner*—Stuart S. Levy
*Assistant Examiner*—Lynn M. Sohacki
*Attorney, Agent, or Firm*—Peter K. Kontler

[57] ABSTRACT

The thrust bearing for the shaft of a boiler feed pump in a nuclear reactor plant is cooled by a first stream of lubricant which is drawn from a sump by an impeller receiving motion from the shaft. The first stream constitutes one branch of a larger second stream which flows from the discharge end of the impeller. A third stream constituting another branch of the second stream is sprayed against and is cooled by the housing of the feed pump. The first and third streams are caused to reenter the sump by gravity flow. The exterior of the housing is provided with heat dissipating ribs.

13 Claims, 1 Drawing Figure

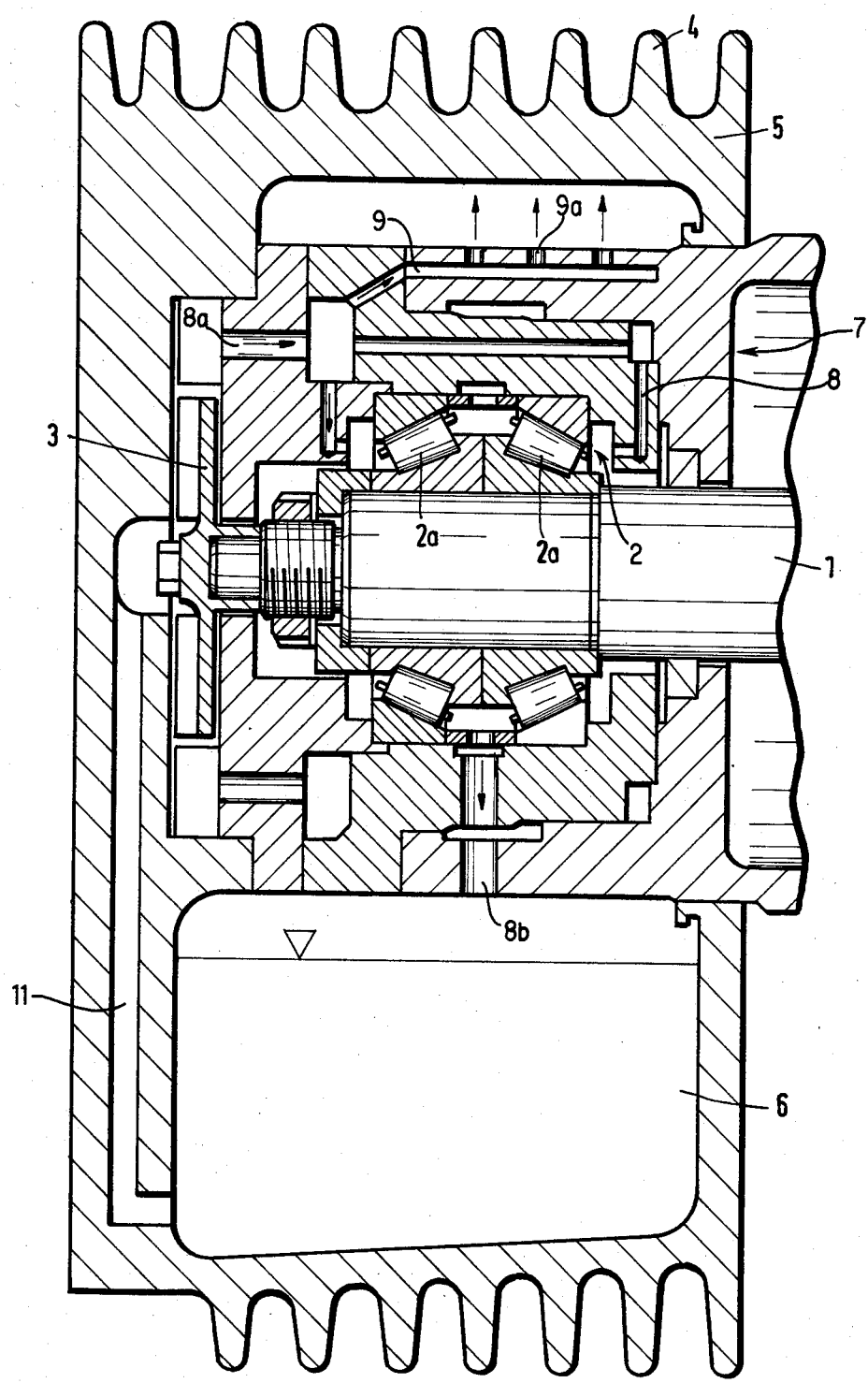

LUBRICATING SYSTEM FOR SHAFT BEARINGS

BACKGROUND OF THE INVENTION

The present invention relates to lubricating systems for shaft bearings, and more particularly to improvements in lubricating systems for bearings which are subjected to pronounced thermal stresses. Typical examples of such bearings are thrust bearings for the shafts of boiler feed pumps in nuclear reactor plants.

In accordance with the presently prevailing practice, shaft bearings which are maintained at elevated temperatures are lubricated by oil which is cooled in a heat exchanger. As a rule, the coolant is water. Such lubricating systems are satisfactory when the temperature in the region of the shaft bearing is below 100° C. However, a boiler feed pump which is installed in a nuclear reactor plant must be constructed and assembled in such a way that, in the event of a catastrophy, its satisfactory operation remains assured at temperatures well above 100° C. and when the relative moisture content of air is 100%. Moreover, such pumps must be capable of operating properly without any aqueous coolant for the lubricant. In many presently known safety boiler feed pumps for use in nuclear reactor plants, the shaft of a multistage centrifugal boiler feed pump with an average output is mounted in conical roller bearings which is rather unusual for such types of pumps. Conical roller bearings are quite satisfactory as long as the temperature in the surrounding area does not exceed 200° C., i.e., the cooling action upon lubricant which is used for such bearings must suffice to ensure that the temperature of the bearing does not rise above 200° C. The maximum permissible temperature for normal oils is in the range of 150° C. but such temperature can be raised to approximately 200° C. without cracking of oil by resorting to special additives. In order to prevent excessive heating of oil which lubricates a conical roller bearing, centrifugal pumps of the above outlined character are often equipped with gear pumps which circulate the oil and with specially designed oil cooling units. This contributes significantly to the initial and maintenance costs of boiler feed pumps.

OBJECTS AND SUMMARY OF THE INVENTION

An object of the invention is to provide a novel and improved lubricating and lubricant cooling system for the bearings of shafts which are used under circumstances where the temperature of the bearings is high or very high.

Another object of the invention is to provide a novel and improved fluid flow machine which embodies the improved lubricating and lubricant cooling system.

A further object of the invention is to provide a lubricating and lubricant cooling system for shaft bearings which can be used with advantage in safety boiler feed pumps in nuclear reactor plants.

An additional object of the invention is to provide a lubricating and lubricant cooling system which need not be equipped with discrete lubricant cooling means.

Another object of the invention is to provide a novel and improved method of lubricating a shaft bearing and of maintaining the temperature of the lubricant below a given value.

Still another object of the invention is to provide a lubricating and lubricant cooling system which is not only more effective but also more compact and less expensive than heretofore known systems.

The invention is embodied in a fluid flow machine (especially a safety boiler feed pump for use in nuclear reactor plants) wherein a rotary shaft is subjected to pronounced thermal stresses. The machine comprises a bearing (e.g., a roller thrust bearing) for the shaft and a cooling unit for the bearing. Such cooling unit comprises a source of flowable lubricant (e.g., oil which can stand temperatures of up to at least 200° C.), pump means for drawing lubricant from the source, means defining for a first portion of the pumped lubricant a first path extending through the bearing and back to the source and for a second (e.g., the entire remaining) portion of the pumped lubricant a second path also terminating at the source, and means for cooling the lubricant in the second path.

The cooling means can include a wall having a first side along which the second path extends and a second side where the temperature is below that of lubricant in the second path so that the wall withdraws heat from the lubricant which is preferably sprayed or otherwise propelled against the first side of the wall. The wall can form part of the housing of the fluid flow machine and its second side can be provided with heat dissipating means in the form of cooling ribs, fins or the like.

The pump means can constitute a centrifugal pump having an impeller which is driven by the shaft of the fluid flow machine.

The source of lubricant can constitute a sump which is located at a level below the bearing so that lubricant which is admitted into the bearing along the first path can return into the sump by gravity flow. The pump means can circulate the lubricant at an elevated pressure so that the path defining means can include means for finely atomizing the lubricant in the second path and for spraying the atomized lubricant against the cooling means to effect rapid and pronounced cooling of the respective stream of lubricant. The cooling means is preferably disposed at a level above the sump so that the cooled lubricant can return into the sump by gravity flow. If the shaft is horizontal, the sump is preferably located below the shaft and its bearing, and that portion of the housing of the fluid flow machine which constitutes the cooling means can be located at a level above the shaft. The two paths can include a common portion immediately downstream of the pump means.

The novel features which are considered as characteristic of the invention are set forth in particular in the appended claims. The improved system itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of a centrifugal boiler feed pump for use in nuclear reactor plants or the like wherein the illustrated thrust bearing is lubricated by a stream of oil which is cooled and circulated in accordance with the present invention.

DESCRIPTION OF THE PREFERRED EMBODIMENTS

The drawing shows a portion of a fluid flow machine constituting a boiler feed pump for use in a nuclear reactor plant. The pump comprises a housing 5 which has an outer side provided with heat dissipating ribs 4. The pump shaft 1 is horizontal and is rotatable in a conical roller thrust bearing 2 with two annuli of frustoconical rolling elements 2a. This bearing is mounted in a block-shaped member 7 constituting a means which defines two elongated paths, namely, a first path for the circulation of a lubricant (normally oil) from a source of supply 6 through the bearing 2, and a second path for circulation of lubricant along the inner side of the housing 5 and back to the source. The latter is a sump which is provided in the lower portion of the housing 5 at a level below the bearing 2. The first path is defined by a plurality of channels or bores 8 which are machined into the block-shaped member 7 and extend from the outlet of a centrifugal pump in the form of an impeller 3 mounted on the left-hand end portion of the shaft 1. The portion 8a of the channel 8 is common to a second channel 9 defining the second path for a stream of lubricant which issues at a requisite pressure via ports 9a of the block-shaped member 7 and is propelled (e.g., sprayed) against the inner side of the housing 5 so that it is cooled because the housing dissipates heat by way of the ribs 4. The thus cooled stream of lubricant flows downwardly along the inner side of the housing 5 and back into the sump 6. The impeller 3 of the centrifugal circulating pump draws lubricant from the sump 6 by way of a passage 11. The pump housing 5 constitutes a means for cooling the stream of lubricant which is sprayed thereagainst via ports 9a, and the thus cooled lubricant is mixed in the sump 6 with heated lubricant which descends by gravity from the bearing 2 via portion 8b of the first channel 8.

It has been found that the improved lubricant cooling system is highly effective in a centrifugal boiler feed pump or the like. The shaft 1 can be mounted in several thrust bearings which may but need not be identical with the bearing 2, and each such bearing can be cooled by a discrete lubricant circulating pump in conjunction with the heat extracting housing 5 and a suitable device which defines for the pumped lubricant several paths, one leading past or through the corresponding bearing and the other leading to the cooling means and back to the source.

An important advantage of the improved lubricant cooling and circulating system is its compactness and low cost. In addition, such system is reliable in operation and it can be installed in existing types of centrifugal pumps or analogous fluid flow machines. The parts of the improved system can be readily integrated into (or are already integral with) the fluid flow machine so that they do not contribute to the bulk of such machine. The cooling action is highly satisfactory.

It is clear that each of the two paths which are defined by the block-shaped member 7 (this member can constitute an integral part of the housing 5) need not convey the same quantity of lubricant per unit of time. For example, the arrangement may be such that the quantity of lubricant which is cooled by the adjacent wall of the housing 5 can exceed the quantity of lubricant which flows through the bearing 2 and back to the sump 6. Also, the bearing 2 need not constitute a thrust bearing and the block-shaped member can define one or more paths for the flow of two or more streams of lubricant through two or more discrete bearings.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a fluid flow machine or the like wherein a rotary shaft is subjected to pronounced thermal stresses, the combination of a bearing for the shaft, and a housing and cooling unit for the bearing, said cooling unit comprising a source of liquid lubricant, means in said housing defining a first path extending through the bearing and back to said source, and a second path terminating at said source, means for cooling the lubricant in said second path including a wall of said housing, and pump means for drawing a solid stream of liquid lubricant from said source, raising the pressure of the lubricant, conveying a solid first stream of the liquid lubricant along said first path under pressure, and spraying a second steam of the lubricant against said wall.

2. The combination of claim 1, wherein said bearing is a thrust bearing.

3. The combination of claim 1, wherein the shaft, is the shaft of a boiler feed pump of a nuclear reactor plant.

4. The combination of claim 1, wherein said wall is provided with heat dissipating means.

5. The combination of claim 4, wherein said heat dissipating means includes cooling ribs.

6. The combination of claim 1, wherein said pump means comprises an impeller which is driven by the shaft.

7. The combination of claim 1, wherein said pump means comprises a centrifugal pump.

8. The combination of claim 1, wherein said source includes a sump which is located at a level below said bearing so that lubricant which is admitted into the bearing along said first path can return into the sump by gravity flow.

9. The combination of claim 8, wherein said cooling means is disposed at a level above said sump so that the lubricant which is cooled thereby can return into the sump by gravity flow.

10. The combination of claim 1, wherein the shaft is substantially horizontal, said source being located at a level below said bearing and said cooling means being disposed at a level above said bearing.

11. The combination of claim 1, wherein said first and second paths include a common portion immediately downstream of said pump means.

12. The combination of claim 1, comprising means for atomizing the lubricant in said second path upstream of, and directing the atomized lubricant against, said cooling means.

13. The combination of claim 1, wherein said cooling unit is designed to prevent substantially all heat flow into the second stream of lubricant between withdrawal of the second stream from and reentry of the second stream into said source.

* * * * *